US005146058A

United States Patent [19]

Herfindahl et al.

[11] Patent Number: 5,146,058

[45] Date of Patent: Sep. 8, 1992

[54] MICROWAVE RESONANT CAVITY APPLICATOR FOR HEATING ARTICLES OF INDEFINITE LENGTH

[75] Inventors: Dean R. Herfindahl, Wilmington, Del.; Hua-Feng Huang, Chadds Ford, Pa.; Richard W. Lewis; Walter A. Wallace, both of Wilmington, Del.

[73] Assignee: E. I. Du Pont de Nemours and Company, Wilmington, Del.

[21] Appl. No.: 634,795

[22] Filed: Dec. 27, 1990

[51] Int. Cl.[5] .......................... B23K 15/10; H05B 6/64

[52] U.S. Cl. ....................... 219/10.55 A; 219/10.55 B; 219/10.55 F; 219/10.55 R; 333/227; 333/230; 34/1 R; 156/180

[58] Field of Search ................. 219/10.55 A, 10.55 B, 219/10.55 F, 10.55 R, 10.55 E; 333/227, 230, 73 W, 83 R; 34/1; 156/180

[56] References Cited

U.S. PATENT DOCUMENTS

| | | | |
|---|---|---|---|
| 3,544,927 | 12/1970 | Elder et al. | 333/73 |
| 3,557,334 | 1/1971 | Lewis | 219/10.55 |
| 3,582,849 | 6/1971 | Post | 335/213 |
| 3,673,370 | 6/1972 | Johnson | 219/10.55 |
| 3,748,604 | 7/1973 | Wang | 333/73 W |
| 3,872,603 | 3/1975 | Williams et al. | 34/1 |
| 4,003,774 | 1/1977 | Lebet et al. | 156/180 |
| 4,488,027 | 12/1984 | Dudley et al. | 219/10.55 A |
| 4,602,141 | 7/1986 | Naito et al. | 219/10.55 |
| 4,847,460 | 7/1989 | Kieser et al. | 219/10.55 A |
| 4,859,821 | 8/1989 | Meyer et al. | 219/10.55 A |
| 4,908,486 | 3/1990 | Fry | 219/10.55 A |
| 4,954,679 | 9/1990 | Harms et al. | 219/10.55 M |

*Primary Examiner*—Bruce A. Reynolds
*Assistant Examiner*—Tu Hoang

[57] ABSTRACT

A rectangular microwave resonant cavity applicator comprising two spaced-apart, cavity-containing sections is disclosed for heating a product web. Each section has a planar peripheral lip which faces the other and the sections are spaced apart by a distance "d". The lips have arrays of ferrite segments mounted on their surfaces which serve to limit radiation of microwave energy from the open space between the sections, through which the product web passes.

8 Claims, 3 Drawing Sheets

MICROWAVE RESONANT CAVITY APPLICATOR FOR HEATING ARTICLES OF INDEFINITE LENGTH

BACKGROUND OF THE INVENTION

1. Field of the Invention

The present invention relates to a high Q, resonant microwave cavity applicator intended to dry and heat treat running, wet, articles of indefinite length, particularly fibers, and more particularly fibers of aramids.

2. Description of the Prior Art

U.S. Pat. No. 3,557,334 discloses a microwave resonant cavity applicator powered by a magnetron which is connected thereto by waveguide, a three port circulator, and an iris. A water load connected to the circulator absorbs nearly all of the reflected energy from the applicator.

SUMMARY OF THE INVENTION

The present invention relates to a rectangular microwave resonant cavity applicator associated with rolls adapted to feed an article of indefinite length therethrough. The cavity comprises fixed and moveable similarly-shaped opposing hollow cavity sections between which the article to be heated passes. The outer periphery of each section has a planar lip surface, parallel with and facing the lip surface of the opposing section. Arrays of contiguous rectangular ferrite segments are mounted to the lip surfaces and together provide a non-contacting magnetic field containment means for electromagnetic energy stored within the open cavity structure. The cavity is excited by a magnetron source that feeds microwave energy through a waveguide and an impedance matching iris into the base of the fixed cavity section. The iris connects the waveguide to the cavity and is readily exchangeable with irises of different sizes to meet anticipated product line changes. An impedance matching probe positioned adjacent to the iris can be adjusted to compensate for load impedance variations as they occur and thereby optimize the degree of overcoupling.

The moveable cavity section is displaceable with respect to the fixed section along the normal to the plane of symmetry between the two sections as a means to tune the cavity to resonate with the magnetron frequency in a TM-11n mode. In this mode, uniform heating across the width of a running elongated article is obtained.

DETAILED DESCRIPTION OF THE DRAWINGS

Figure 1:
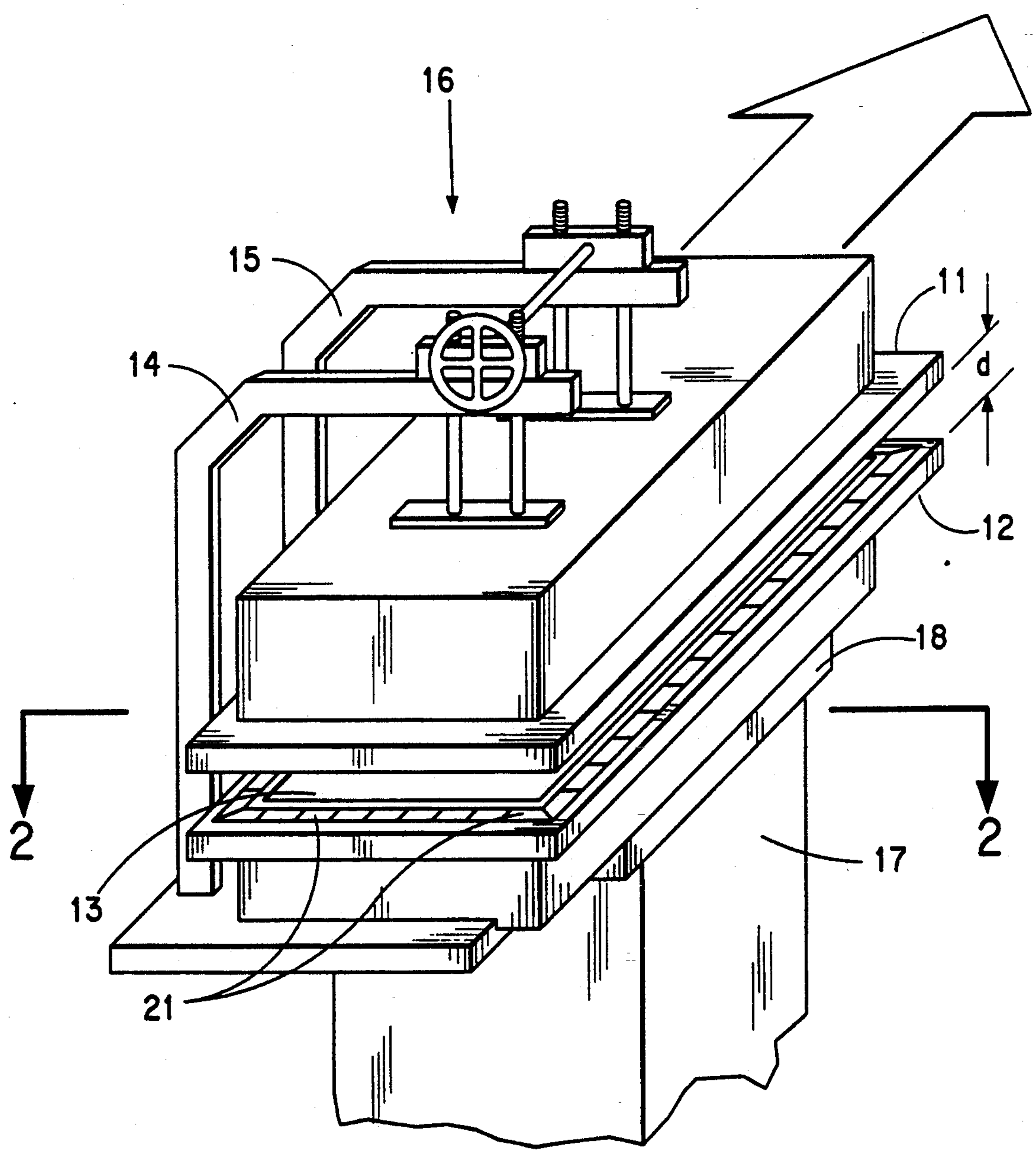
FIG. 1 is a, perspective view of the cavity structure of the present invention.

Referring now to FIG. 1, the open resonant cavity applicator of the present invention comprises identically shaped moveable upper section 11 and fixed lower section 12 with respective milled out internal portions to form a cavity 13. The two cavity sections must be made of a highly electrically conductive material such as cast aluminum with the interior surface preferably highly conductive and nonporous to obtain the highest values of Q. Noble metals such as gold or platinum are preferred where corrosion is a concern. The sections are spaced apart from one another by gap distance "d" which determines the resonant frequency of the cavity. The Sections 11 and 12 are provided with planar peripheral lips that face each other.

Upper section 11 is supported by cantilever, C-clamp type, beams 14 and 15 and lift mechanism indicated generally at 16. Lower section 12 is supported rigidly on a base and connected by waveguide 17 through the iris coupling means designated generally as 18. The cavity 13 is milled out from the internal portion of the two sections 11 and 12.

Sections 11 and 12 each are fitted with arrays of rectangular ferrite segments 21 to form a magnetic field containment means for stored electromagnetic energy in the cavity. To form the arrays, ferrite segments are laid side by side around the lips of the aluminum sections and are attached thereto using a heat conductive epoxy. Although the width of the ferrite arrays is not critical, the segments should be spaced outward from the inner edge of the cavity by a small distance to limit microwave leakage to levels below 1.0 $mW/cm^2$ while avoiding overheating of the ferrite arrays.

The cavity dimensions for the resonant mode of the invention specified herein have been selected such that a TM-110 mode is excited at a center frequency of 915 MHz. Excitation frequencies of a few hundred to a few thousand MHz are just as suitable, provided external radiations fall within allowable Government restrictions. Gap distance "d" between the cavity sections is then adjusted to tune the selected mode frequency. Since cavity width, length, and depth dimensions are conveniently chosen to specify a mode frequency that is sufficiently spaced from the next adjacent mode frequency occurrence, undesirable "mode hopping" from the effects of an extreme product moisture variation or source frequency change is unlikely. Were mode hopping to occur, the presence of nulls and hot spots in the field distribution pattern would destroy the uniform dielectric heating requirement for wide product heating applications that the invention uniquely satisfies.

In order to prevent excessive moisture from condensing on the walls of the cavity, the cavity can be vertically mounted, the lower cavity 12 provided with drain holes, or the walls of the cavity heated to above the dew point of the moisture being removed from the product being heated.

Figure 1A:
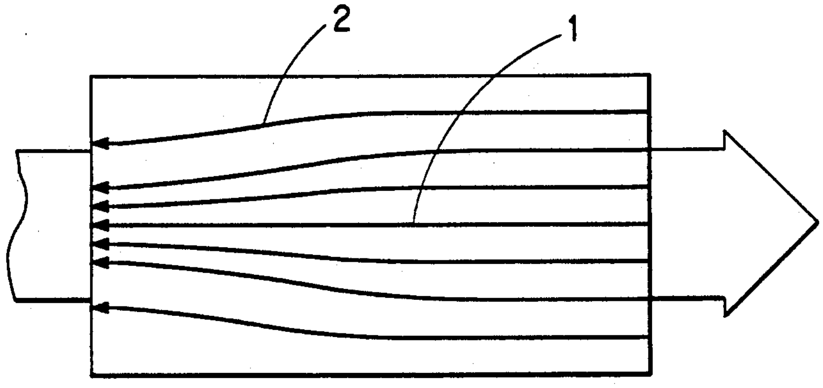
FIG. 1A and 1B are diagrams of the electric field distribution within the cavity structure of FIGS. 1 and 3.
Figure 1B:
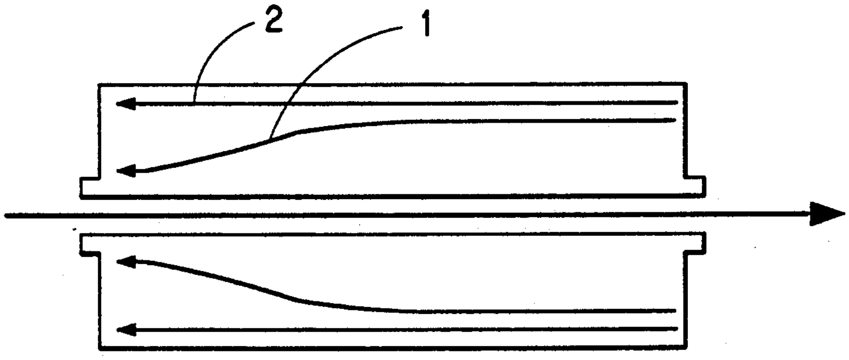

When heating a wide, wet, product web, or an array of threadlines, and exciting with a TM-110 E-field pattern; a high dielectric constant causes the electric field lines to be attracted to the product with resultant stray field coupling and heating. This is shown in FIGS. 1A and 1B. FIG. 1A is a top view of the cavity with the large arrow representing the product path and the smaller arrows representing the instantaneous distribution of the electric field lines with heads terminating at the inlet side and tails at the outlet, respectively. This illustrates the way the field lines of the TM-110 mode are bowed in from the sides of the cavity toward wet product. This produces an increase in field intensity and thus heating capability at the inlet end. FIG. 1B is a side view of the cavity with arrows 1 and 2 identifying electric field lines corresponding to similarly located field lines in FIG. 1A, showing additional bowing to meet the input wetter product. Although the coupling effect would normally be at a maximum at the applicator inlet and a minimum as the product moisture levels off, the applicator of the present invention has been designed in such a way that the product is met by a maximum E-field flux immediately upon entry into the gap between the cavity sections since the TM-110 mode provides a step increase in the electric field at that point. This provides a desirable "fast kick" to elevate the product heating rate. The cavity is tuned to operate in an overcoupled mode, that is, as the product load increases, the net energy into the applicator also increases. The degree of overcoupling is set empirically by choosing an oversized iris opening so that at maximum expected product load, the net energy to the cavity, is near maximum. This is the most stable operating condition for heating wet products. The terms overcoupled, undercoupled, and critical coupled relate to source-load coupling and are explained by R. W. Lewis in U.S. Pat. No. 3,557,334.

Figure 2:
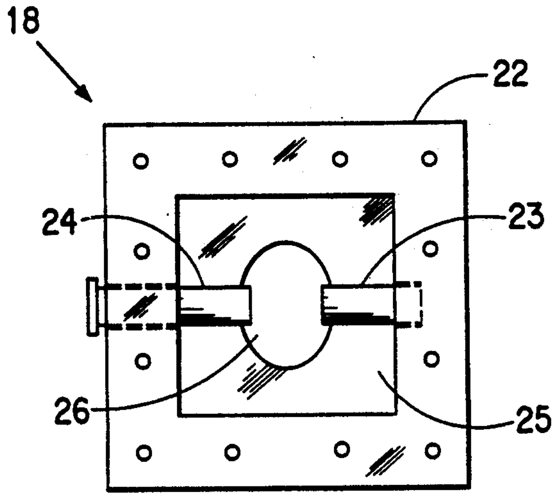
FIG. 2 is a cross-sectional view of the stub-tuned iris taken on line 2—2 of FIG. 1 at the junction of the waveguide with the fixed lower cavity section.

Referring now to FIG. 2, an iris coupler with an adjustable stub impedance matcher is indicated generally at 18. The tunable coupler comprises an electrically conductive flange 22, preferably made of brass, which is slideable into waveguide 17 adjacent to lower section 12 and bolted thereto. Threaded into the flange 22 are opposing probes 23 and 24. The probes are made of a conductive material preferably brass, and are about one quarter inch (0.635 cm) in diameter. Probe 23 is fixed whereas probe 24 is rotatable and threaded for adjusting the impedance match between waveguide section 17 and cavity 13. In some applications, a single rotatable probe has been found to be adequate. A thin metal aperture plate 25, made of a conductive material such as brass, with an elliptically shaped iris 26, is used as a mating surface between coupler 18 and lower section 12. From assorted iris sizes, one is selected that would best match the particular load being treated to obtain overcoupling. The elliptically shaped iris has been found to be superior to rectangularly shaped irises for this purpose since an ellipse provides a resonant match that is able to dissipate higher power transfer without distortion. The adjustable stub iris arrangement allows one to change the degree of coupling without the need to disassemble the system. It also permits an operator to change the coupling with the applicator on line, as product is running, by rotating probe 24 to open or close the gap between probes 23 and 24. When large product parameter changes are made, such as the number of fiber ends present in the run, when wet fibers are being heated, the operator can neutralize the resultant impedance mismatches and higher reflected power levels as soon as they occur. It is well known that source and load impedance must be matched in order to obtain most efficient power transfer; but it should also be appreciated that, at high reflected power levels, the circulator is limited as to how much power it can safely handle to protect the magnetron. Consequently, in order to avoid the possibility of source failure, changing the degree of coupling with adjustable probe 24 must be effective and rapid.

Construction details for the cavity are relatively simple. Two 18" (45.72 cm) wide×3.38" (8.59 cm) high×33" (83.82 cm) long aluminum 6061 T4 blocks were used to construct cavity sections for a 915 MHz cavity applicator for operation in a TM-110 mode. The blocks were milled out to cavity dimensions 12" (30.48 cm) wide×3.20" (8.13 cm) deep×27" (68.58 cm) long with its four corners radiused to 0.25" (0.64 cm). A microwave inlet port was then milled in one of the two cavity sections with dimensions 9.875" (25.08 cm)×3.75" (9.52 cm) to accommodate an adjustable elliptical iris assembly; and a 1" diameter hole was bored through the center of the other section to provide a drainage port. To each cavity section was mounted a 3.50" (8.89 cm) wide picture-frame-type lip surface into which was milled a 2.39" (6.07 cm) wide×0.22" (0.56 cm) deep peripheral groove to accommodate the ferrite segments. The groove was centered so that the inner edge of the groove was spaced 0.75" (1.90 cm) from the inner edge of the cavity. Finally, the inner surface of each cavity section was polished to an RMS 32 finish.

The adjustable elliptical iris assembly was adopted from the dimensions of a standard EIA WR975 aluminum flange. A 0.62" (1.57 cm) diameter hole was drilled midway along the long dimension of the flange into the center void region. An oversized brass sleeve was then snugly fitted into the hole and threaded with fine 0.75" 40 threads to accommodate a 4.25" (10.8 cm) long threaded brass probe. When fully inserted, the rounded probe tip 0.375" (0.95 cm) radius could extend into the void 3.1" (7.87 cm) with its surface within 0.06" (0.15 cm) of the iris to provide a compact, finely adjustable, impedance match. This assembly was later found to provide SWR changes as little as 1.05 to frequency variations as wide as 10 MHz. A series of elliptical irises were fabricated from 6061-T6 aluminum sheet of 0.13" (0.33 cm) thickness with major axis lengths ranging from 6.5 (16.51 cm) to 3" (7.61 cm) with a minor to major axis length ratio of 0.75. These sizes were empirically determined to accommodate expected product load changes. Each iris was found to be able to accommodate a 3 to 1 load variation when used with the moveable probe assembly.

A series of 2.375" (6.03 cm) square ferrite tile segments (model Eccosorb NZ-51 obtained from Emerson & Cumming, Inc. of Canton, Ohio) were mounted into the cavity half section grooves with Eccosil 1776 heat conductive epoxy. Twelve (12) tiles were fitted side by side along the long dimension of each cavity half section groove and seven and one half (7½) tiles along the narrow dimension to form the electromagnetic field containment means.

The completed cavity assembly was mounted to the cantilever C-clamp beam assembly using a three contact point measurement to guarantee that the two sections were maintained in parallel with one another when adjusting their separation during tuning, which was normally within about 0.25" (0.64 cm).

Figure 3:
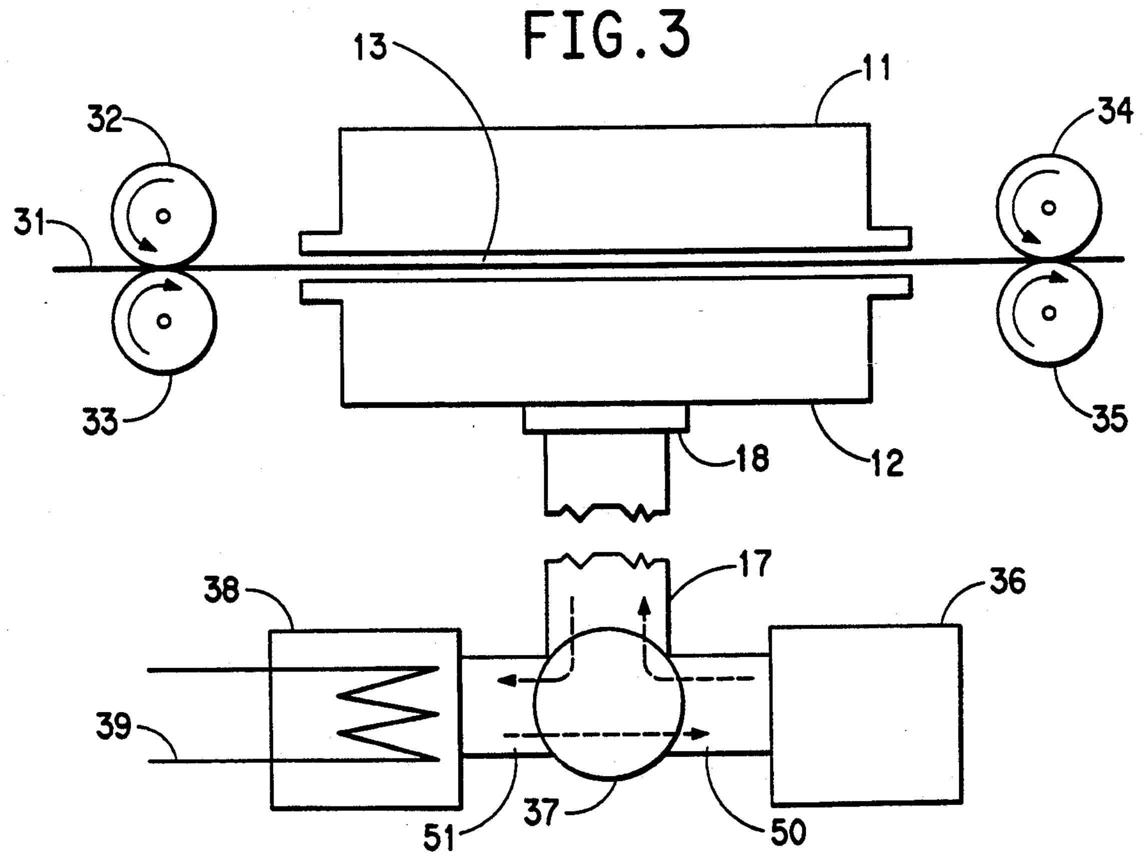
FIG. 3 is a block diagram of the cavity applicator system.

Referring now to FIG. 3, the applicator system of the present invention is depicted in blocks. A wet web, such as a film or an array of threadlines 31, is passed around or between tension rolls 32 and 33, between sections 11 and 12 and between or around tension rolls 34 and 35. Threadlines 31 are then further processed or taken up on means not shown. Microwave energy passes from magnetron 36 (typically an RCA C9660) which is driven by a Microdry 915 MHz 50 kW microwave generator though waveguide 50, and adjustable iris 18 to the base of lower applicator section 12 and associated cavity 13. A microwave transmissive window made, for example, from a fluoropolymer, can be installed between the cavity and waveguide 17 to protect the iris from condensate. Reflected power returns through waveguide 17 and circulator 37 through waveguide 51 to water load 38 for power absorption and conversion into heat. Heat is removed from water load 38 by means of heat exchanger 39. A small percentage of the incident reflected energy is reflected from the water load 38 back to the magnetron 36 in the proper phase as a mechanism to pull the magnetron frequency so that it remains locked to the applicator frequency. Operator adjustment of iris 18 limits the incident pulling power to levels acceptable to both circulator 37 and magnetron 36.

Although adaptable to treating dried yarns, the microwave applicator has been found to be extremely useful for drying and heat treating as spun, never-dried, filaments of poly(p-phenylene terephthalamide) (PPD-T) containing from 20 to 200 wt. %, based on the dry filament, of water. The microwave applicator of the present invention can dry and heat such fibers using a residence time, in the applicator, of as short as 0.05 to 0.5 second by heating to a temperature of 100° to 550° C. Either 915 MHz or 2450 MHz units can be used singly or in tandem or in combination. For the higher end of the temperature range (350°-500° C.), it is preferable to use two microwave applicators in sequence.

Poly(p-phenylene terephthalamide) filaments, made by customary methods, generally have a density of 1.44-1.45 g/cc. By rapidly heating the as-spun, wet, never-dried filaments of PPD-T by the microwave applicators of this invention to 250°C. to 450° C. and especially 270° C. to 350° C., filaments having a density of 1.36 to 1.43 g/cc can be obtained which have a tenacity and a modulus equivalent with those of PPD-T fibers made by customary heating methods. By heating to at least 500°C. with a combination of two such applicators in sequence, PPD-T filaments with very high modulus (greater than 1100 gpd) and high tenacity (greater than 18 g/cc) can be obtained. The subject applicator system is useful to provide a uniform high intensity electromagnetic field or rapid heat treating (annealing) or drying flat articles of indefinite length and with varying susceptibility such that a product of highly uniform cross sectional and lengthwise physical characteristics is produced. In addition to fibers and filaments, such products might include: paper, fabrics, polymeric films and pulp.

We claim:

1. A rectangular microwave resonant cavity applicator having a pair of opposing hollow cavity sections with peripheries and with edges which are uniformly spaced apart by a distance "d" around the peripheries of the hollow cavity sections, the periphery of each of said hollow cavity sections having a planar lip surface with an inner edge and an outer edge and each of said planar lip surfaces facing the other, each of said planar lip surfaces having mounted thereon non-contacting electromagnetic field containment means, one of said hollow cavity sections having a central part of its cavity fitted with a source of microwave energy which travels through a waveguide to said hollow cavity section and is coupled by means of an iris, and means adapted to move articles of indefinite length between said hollow cavity sections.

2. A rectangular microwave resonant cavity applicator having a pair of opposing hollow cavity sections with peripheries and with edges which are uniformly spaced apart by a distance "d" around the peripheries of the hollow cavity sections, the periphery of each of said hollow cavity sections having a planar lip surface with an inner edge and an outer edge and each of said planar lip surfaces facing the other, each of said planar lip surfaces having mounted thereon an array of contiguous ferrite segments as a non-contacting electromagnetic field containment means, one of said hollow cavity sections having a central part of its cavity fitted with a source of microwave energy which travels through a waveguide to said hollow cavity section and is coupled by means of an iris, and means adapted to move articles of indefinite length between said hollow cavity sections.

3. The applicator of claim 2 wherein the ferrite segments are spaced outward from the inner edge of the planar lip surfaces by a distance at least as great as "d".

4. The applicator of claim 1 wherein one of the cavity sections is displaceable with respect to the other to alter the distance "d".

5. The applicator of claim 1 wherein the hollow cavity sections are made of a highly electrically conductive metal plated with a polished metal selected from the group consisting of silver, gold, and platinum coating in said hollow cavity.

6. The applicator of claim 1 wherein the iris is elliptically shaped.

7. The applicator of claim 6 wherein the iris is fitted with at least one moveable impedance matching probe.

8. The applicator of claim 1 wherein the iris is fitted with at least one moveable impedance matching probe.

* * * * *